(No Model.) 2 Sheets—Sheet 1.
J. A. COOKE.
NET FOR CATCHING PORPOISES.
No. 317,733. Patented May 12, 1885.
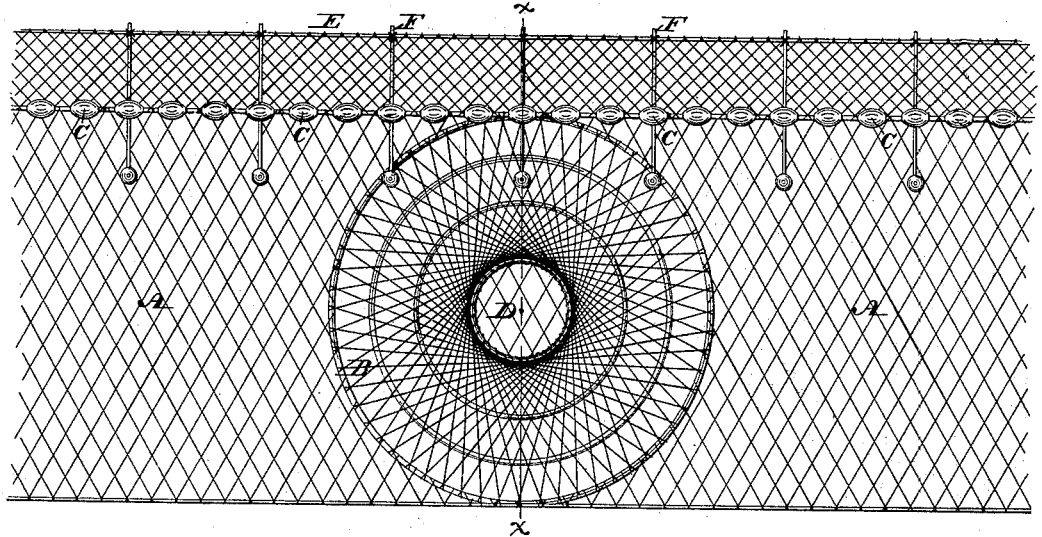
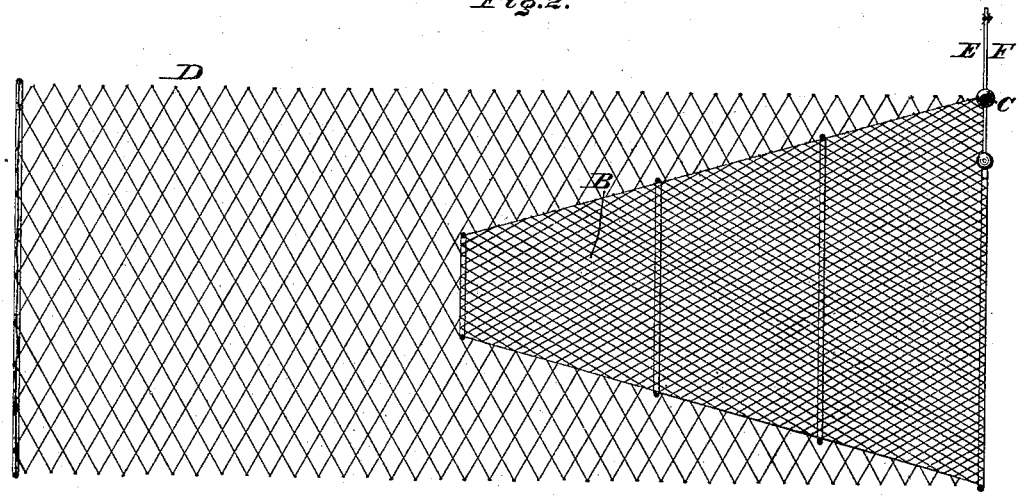
WITNESSES:
INVENTOR:
John A. Cooke,
BY
ATTORNEY.

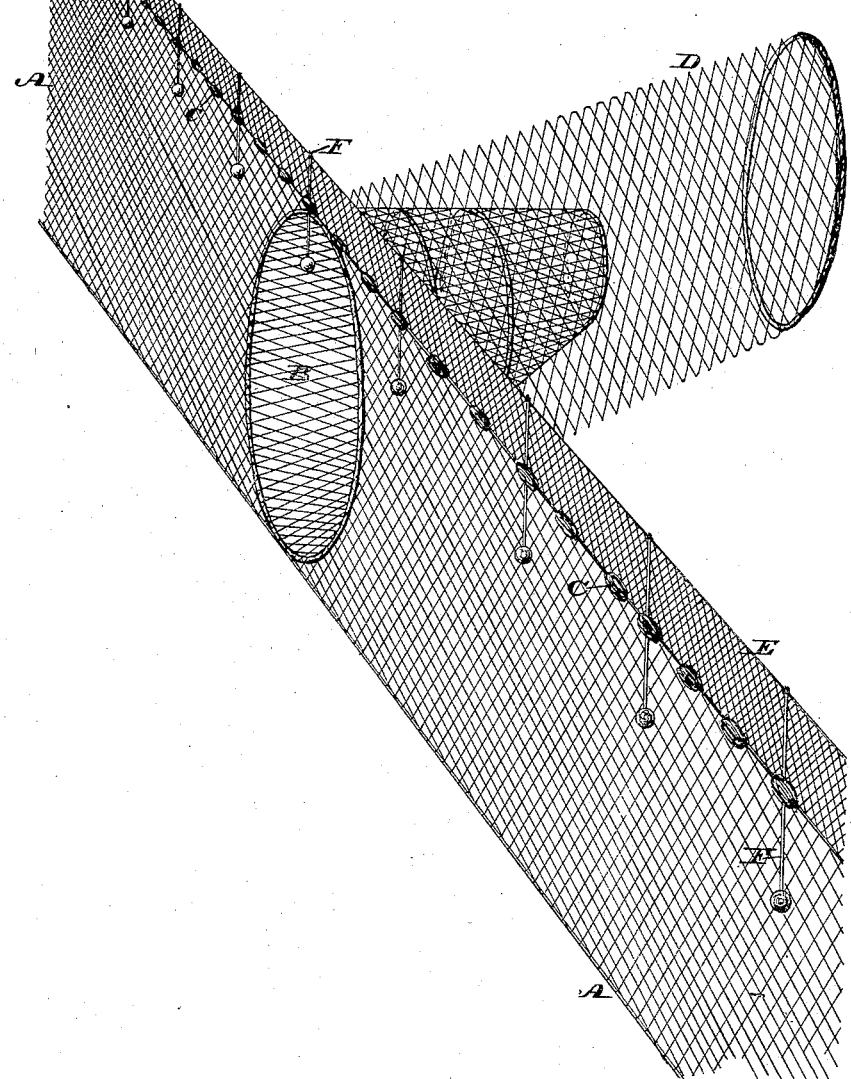

United States Patent Office.

JOHN A. COOKE, OF CAPE MAY, NEW JERSEY.

NET FOR CATCHING PORPOISES.

SPECIFICATION forming part of Letters Patent No. 317,733, dated May 12, 1885.

Application filed May 29, 1884. (No model.)

*To all whom it may concern:*

Be it known that I, JOHN A. COOKE, a citizen of the United States, residing at Cape May city, in the county of Cape May, State of New Jersey, have invented a new and useful Improvement in Nets for Catching Porpoises, which improvement is fully set forth in the following specification and accompanying drawings, in which—

Figure 1 is a side elevation of a net for catching porpoises embodying my invention. Fig. 2 is a transverse vertical section thereof in line $xx$, Fig. 1. Fig. 3 is a perspective view thereof.

Similar letters of reference indicate corresponding parts in the three figures.

My invention consists of a net for catching porpoises, so constructed that they are prevented from leaping over the net and are also readily caught, as will be hereinafter fully set forth.

Referring to the drawings, A represents the wing or body of a net, B a funnel-shaped trap connected therewith, and C the floats of the net, said body extending vertically and said trap extending horizontally.

Connected with the body is the receiver or pen D of the net, the same being secured with the body so as to surround the trap B and communicate with the same at the narrow end thereof, it being seen that the pen is closed at top, bottom, sides, and outer end, and virtually closed at its inner end, owing to its connection with the body A, so that there is no escape from the net except through said narrow end of the trap B.

To the top of the body A is attached a guard, E, which is formed of netting and rises above the body, being sustained in upright position by means of standards F, which are connected with the upper end of the guard and passed through the floats C, or have their own floats, their lower ends being weighted, it being seen that the guard is above the water-line. When a porpoise reaches the guard, it attempts to leap over the same, but is prevented by the height thereof, and so in its attempts to pass the net it descends or dives, and when it arrives at the opening of the trap B it enters the same, and thereby reaches the receiver D, wherein it is caught, and whence it cannot escape, as the only outlet from said receiver or pen D is the narrow end of the trap B, through which the porpoise cannot return.

Having thus described my invention, what I claim as new, and desire to secure by Letters Patent, is—

1. A net having a body provided with floats and a guard connected with and elevated above said body, substantially as and for the purpose set forth.

2. A net having a body provided with floats, a guard connected with and rising above the body, and supporting-standards connected with said guard, substantially as and for the purpose set forth.

3. A net having a body provided with floats, an elevated guard connected with said body, and a trap and receiver, also connected with said body, substantially as and for the purpose set forth.

JOHN A. COOKE.

Witnesses:
JOHN A. WIEDERSHEIM,
A. P. GRANT.